United States Patent [19]

Epema et al.

[11] Patent Number: 5,277,240
[45] Date of Patent: Jan. 11, 1994

[54] OVERHEAD DOOR ASSEMBLY

[75] Inventors: Sytse Epema, Giekerk; Bart van der Sloot, Weidum, both of Netherlands

[73] Assignee: Tebel Pneumatiek B.V., Netherlands

[21] Appl. No.: 50,765

[22] Filed: Apr. 20, 1993

Related U.S. Application Data

[63] Continuation of Ser. No. 690,520, Apr. 24, 1991, abandoned.

[30] Foreign Application Priority Data

Apr. 24, 1990 [NL] Netherlands ................. 9000978

[51] Int. Cl.$^5$ ............................................. E05F 15/00
[52] U.S. Cl. ................................... 160/188; 160/209
[58] Field of Search ............... 160/188, 201, 189, 194, 160/195, 209, 40

[56] References Cited

U.S. PATENT DOCUMENTS

| | | | |
|---|---|---|---|
| 2,827,114 | 3/1958 | Stroup | 160/201 |
| 3,027,937 | 4/1962 | Wilson | 160/40 |
| 3,034,575 | 5/1962 | Stroup | 160/40 |
| 3,079,987 | 3/1963 | Klein | 160/113 |
| 3,331,158 | 7/1967 | Frakes | 160/40 X |
| 4,095,641 | 6/1978 | Olson | 160/201 X |
| 4,119,133 | 10/1978 | Wolf | 160/201 X |
| 4,320,793 | 3/1982 | Lindbergh | 160/201 |
| 4,350,199 | 9/1982 | Pino | 160/201 |
| 4,811,777 | 3/1989 | Chretien | 160/189 X |
| 4,880,046 | 11/1989 | Gesy | 160/194 |
| 5,056,847 | 10/1991 | Stillwell et al. | 160/188 X |

FOREIGN PATENT DOCUMENTS

| | | |
|---|---|---|
| 2350100 | 5/1973 | Fed. Rep. of Germany . |
| 1175951 | 6/1957 | France . |
| 2083545 | 8/1981 | United Kingdom . |

*Primary Examiner*—David M. Purol
*Attorney, Agent, or Firm*—Merchant, Gould, Smith, Edell, Welter & Schmidt

[57] ABSTRACT

An overhead door assembly designed particularly for use with vehicles such as railroad cars is disclosed. The door assembly is made up of an overhead door, vertical guide members for guiding the overhead door in the vertical direction and horizontal guide members for guiding the door in the horizontal direction. A Motor is provided for driving the door between an open and a closed position. According to the invention, the door is first guided to a position directly in front of the door opening, but slightly spaced therefrom. The door is then moved horizontally in a plugging movement so as to securely close off the door opening.

17 Claims, 6 Drawing Sheets

OVERHEAD DOOR ASSEMBLY

This is a continuation of application Ser. No. 07/690,520, filed Apr. 24, 1991, now abandoned.

BACKGROUND OF THE INVENTION

This invention relates to an overhead door assembly, suitable in particular for use in vehicles such as railroad cars, comprising an overhead door, vertical guide members for guiding the overhead door in the vertical direction, and the horizontal guide members for guiding the overhead door in the horizontal direction, as well as driving means for opening and closing the door.

Such overhead door assemblies are known from practice and are used for example with sheds, garages and the like. An overhead door may consist of a single stiff panel and is then usually referred to by the term up-and-over door. There are also overhead doors known which are built up from a plurality of panels extending horizontally across the entire width of the door and hingedly interconnected. Such articulated doors are referred to by the term sliding door.

The known overhead doors are not satisfactory for use with vehicles such as railroad cars, because the use in railroad cars involve entirely different forces than in stationary uses. Doors of railroad cars may for instance be subject to very strong suction forces, but also to great compressive forces when the end doors of carriages are involved. Under these conditions, the doors should remain closed hermetically and should vibrate as little as possible.

SUMMARY OF THE INVENTION

The object of this invention is to provide an overhead door assembly which is suitable in particular for use in vehicles such as railroad cars. To that end, according to the invention an overhead door assembly of the type described hereinabove is characterized in that the vertical guide means and the driving means cooperate with each other and with the overhead door in such a way that when the overhead door is being closed, it is first brought before the door opening to be closed off. The door is subsequently brought into a position where it closes off the door opening substantially by the vertical guide means through a plugging movement.

BRIEF DESCRIPTION OF THE DRAWINGS

Hereinafter the invention will be further described, by way of example, with reference to the accompanying drawings of one embodiment. In said drawings.

DESCRIPTION OF THE PREFERRED EMBODIMENT

Figure 1:
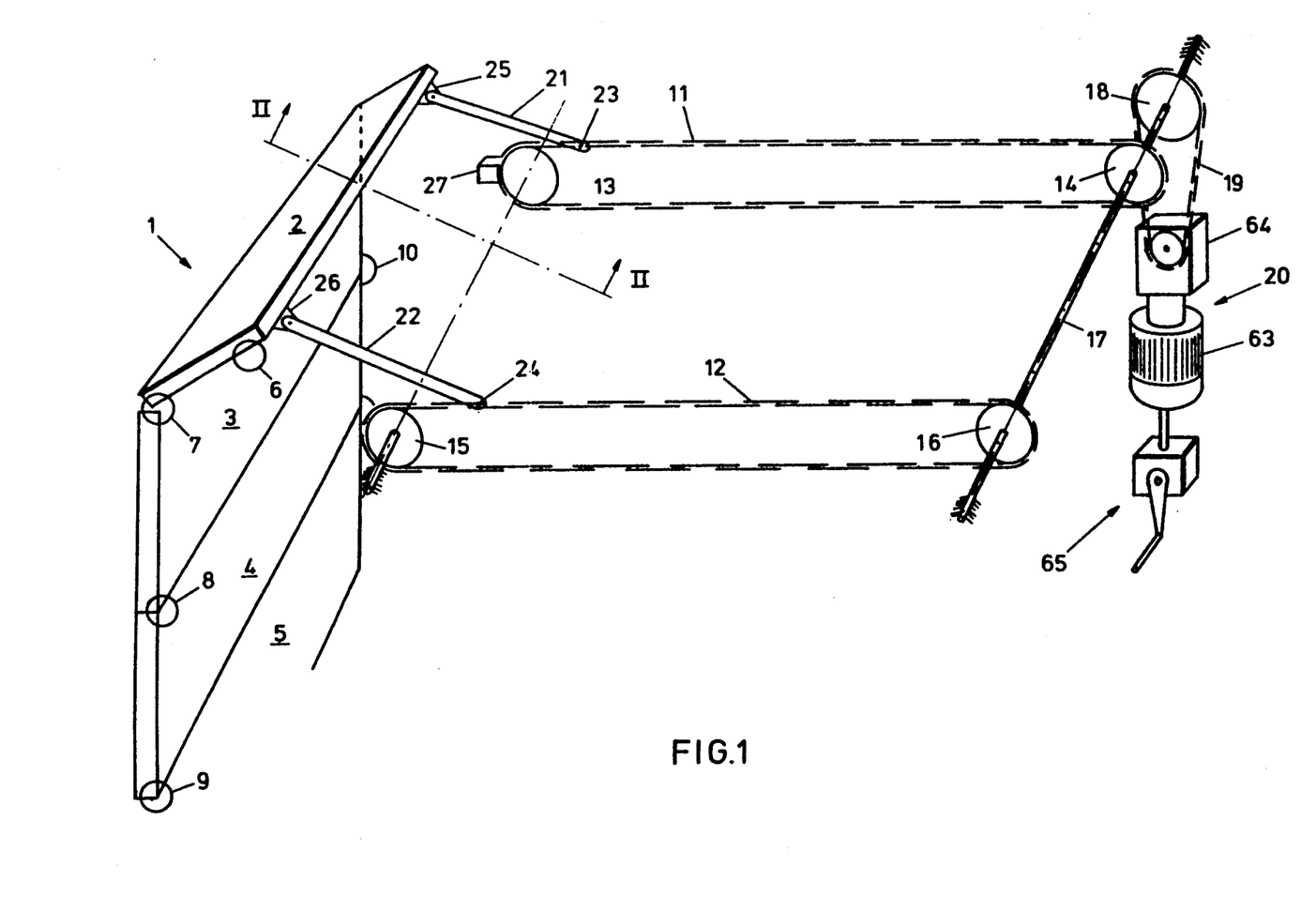
FIG. 1 is a diagrammatic perspective view of an embodiment of a door assembly according to the invention.

FIG. 1 is a diagrammatic perspective view of an embodiment of an overhead door assembly according to the invention, comprising an overhead door 1, which in this embodiment is articulated and is built up from panels 2-5. The panels 2-5 extend in the transverse direction of the door and are hingedly interconnected along horizontal hinge lines. Disposed on opposite sides of the door at the level of the hinge lines and adjacent the terminal edges of the bottom and the top panel 5 and 2, respectively, are a plurality of guide wheels. Several guide wheels 6-10 are shown in FIG. 1. By means of the guide wheels the door is guided along corresponding guide rails during opening and closing of the door, as will be described further hereinafter.

FIG. 1 further shows two endless chains or other similar transport members 11, 12, extending rearwardly on opposite sides of the door opening adjacent the top of the door and each having been passed over two chain wheels 13, 14 and 15, 16, respectively. Rope sheaves, or toothed or untoothed pulleys, may be used in place of the chain wheels. For brevity's sake, hereinafter reference will be made to chain wheels and chains, but they will be understood to include all other similar members such as pulleys and belts (which may or may not be toothed) rope sheaves and ropes, etc. The chain wheels are mounted on bearings in a suitable manner, and in the embodiment shown the rear chain wheels are mounted on a common, driven shaft 17. The shaft 17 carries an additional chain wheel 18 which can be driven by a driving unit 20 via a chain 19.

The chains 11, 12 are each connected to the topmost door panel 2 via a connecting arm 21 and 22, respectively. At one end, at 23 and 24, respectively, the connecting arms are hingedly connected with corresponding links of the chains. At the other end, the connecting arms are hingedly connected to the topmost door panel adjacent its top edge at 25 and 26, respectively.

As can be seen from FIG. 1, upon clockwise rotation of the chain wheels, the arms 21, 22 will move the door towards the right. As a result of the guide rails to be described hereinafter the panels will first travel upwards and then horizontally towards the rear.

Figure 2:
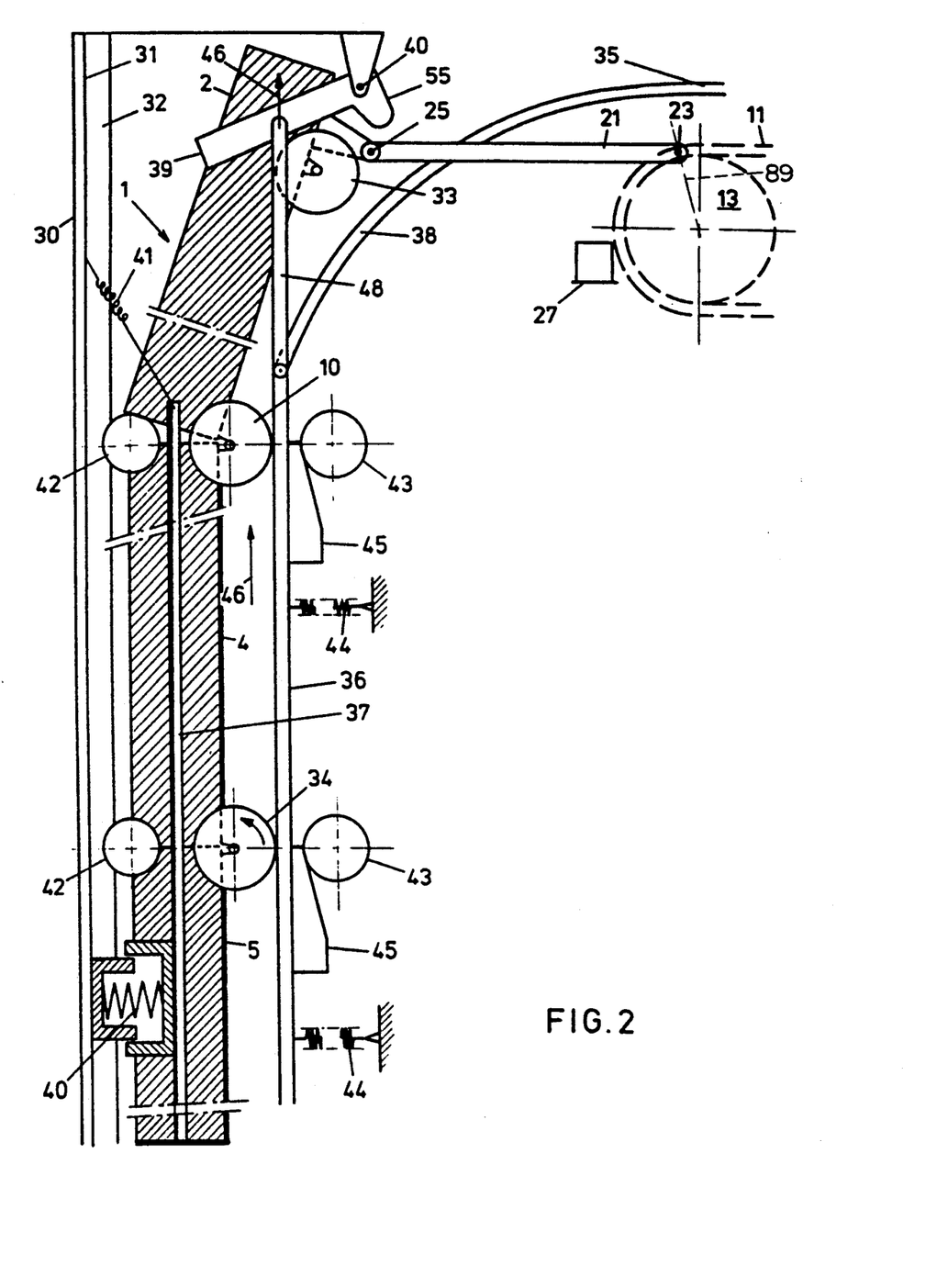
FIG. 2 is a diagrammatic vertical section taken on the line II—II of FIG. 1, showing in more detail a part of an embodiment of a door assembly according to the invention.

When the chain wheels rotate counterclockwise, the arms 21, 22 force the topmost panel from the angled position shown in FIG. 1 into a substantially vertical, closed position. As the panel moves to the closed position, the axis of arm 21 will come into alignment with the imaginary line 89 extending between the center of chain wheel 13 and connecting point 23 (FIG. 2). This position of alignment is the dead center position. Upon further movement to the closed position (i.e., upon further counterclockwise rotation of chain wheel 13), the arm 21 moves over the dead center position. There is provided for at least one of the arms a stop member 27 which is arranged in such a way that the arm abuts against the stop member just after the arm is moved over center.

As a result of this so-called over center closing principle, it is impossible for the door to be opened by exerting a force on the door from outside. Further, the door remains in the closed position even when the power for the driving unit is cut off.

In explanation of the over center closing principle, it is further observed that the topmost panel, in the closed position, will bear on the sealing strips (FIG. 2) at the time when the center of the chain wheel is still just out of register with the connecting arm. Upon further rotation, the panel will be pushed against the sealing strips with more force, the strips being compressed in the process, so that the connecting arm is enabled to travel beyond the dead center position and will abut against the stop 27. In that position, the door is completely closed. Any force exerted on the door from outside will only lead to the connecting arm being forced against the stop 27 more tightly.

FIG. 2 is a diagrammatic view of a part of an embodiment of an overhead door assembly according to the invention. In FIG. 2 and the other figures, the same reference numerals as in FIG. 1 are used, insofar as corresponding elements are involved.

FIG. 2 shows a vertical edge of the door opening to be closed off by the overhead door 1. The vertical edge is formed by a doorpost or a suitable, preferably metal, section 30 with a stop surface 31 for the door panels. The stop surface is provided with a pliable sealing strip 32 (see also FIG. 4). The door panels are shown in practically the same position as in FIG. 1, i.e. the door has almost been shut, but it does not yet hermetically seal the door opening.

FIG. 2 diagrammatically shows the guide members for the guide wheels of the overhead door. In addition to guide wheel 10, FIG. 2 further shows a topmost guide wheel 33 and a guide wheel 34 arranged at the level of the hinge line between the lowermost two panels 4 and 5. The path of travel of the guide wheels comprises a horizontal part formed by at least one horizontal guide rail 35. Further a vertical track is provided which is bounded by a rear vertical section 36 and a front vertical section 37, permitting the guide wheels of the overhead door to move between them. The horizontal guide rail 35 adjoins the rear vertical section 36 in this embodiment via a rail 30 curved as a quarter of a circle.

The rear vertical section 36 is connected to a lever 39 by means of an upwardly extending rod 48 or the like. The lever 39 has a fixed pivot 40 and is adapted to be operated by a projection of the top panel 2 or of the connecting arm 21 in such a way that when the overhead door is being closed, the lever 39 pulls the rod upwards. Advantageously, the top roller 33 can be used to operate the lever 39.

It is observed that at the other side of the door preferably a similar construction is used.

As long as the door is not entirely closed yet, the vertical sections 36, 37 are spaced apart sufficiently so that each guide wheel can only be in contact with one of the vertical sections at the same time. This ensures smooth travelling of the wheels and the sections with minimal wear. Nor does any wear of the sealing strips develop because the door is not in contact with the sealing strips during the vertical movement. Both vertical sections are capable of moving towards the stop surface 31 counter to the spring force. The front vertical sections are supported against a fixed point, for example the stop surface 31, by means of a plurality of compression springs, one of which is shown at 40. Further, the front vertical sections are preferably suspended at the top by means of a tension spring 41. Further, for the front vertical sections, stops 42 are provided which bound the range of travel in the direction of the stop surface 31.

Under spring force the rear vertical sections 36 are pulled rearwardly in the direction of stops 43. For that purpose, in the embodiment shown tension springs 44 are employed. Mounted on the rear sections 36 at the level of the stops 43 are wedge-shaped members 45, whose function will be explained hereinafter.

The operation of the overhead door assembly described is as follows. When, starting from the situation shown in FIG. 2, the chain wheel 13 rotates counterclockwise, the connecting arm 21 forces the top panel 2 of the overhead door 1 into a vertical position. The free end of the lever 39 is moved upwards by the topmost guide wheel 33 or another projection of the topmost panel or the connecting arm. Via the rod 48, the lever pulls the rear vertical section 36 upwards, as indicated by arrows 46 in FIG. 2. During this movement, the wedge-shaped members cooperate with the stops 43, so that the rear vertical section is also forced forwards. Via the guide wheels, the door panels and the front vertical sections are thereby forced in the direction of the support surface 31 until the door panels securely bear against the sealing strip 32. In the completely closed position of the overhead door shown in FIG. 3, the front vertical sections abut against the stops 42. The topmost panel of the door is out of reach of the rear vertical section and is directly forced against the sealing strip by the connecting arms 21, 22. Accordingly, when the overhead door according to the invention is closed, it is first brought before the opening to be closed off and subsequently forced in its entirety against the sealing strip by means of a so-called plugging movement so as to effect the definitive closure. Simultaneously, the arms 21 and 22 travel beyond the dead center position so that movement as a result of any forces applied directly to the door itself, is prevented.

Figure 3:
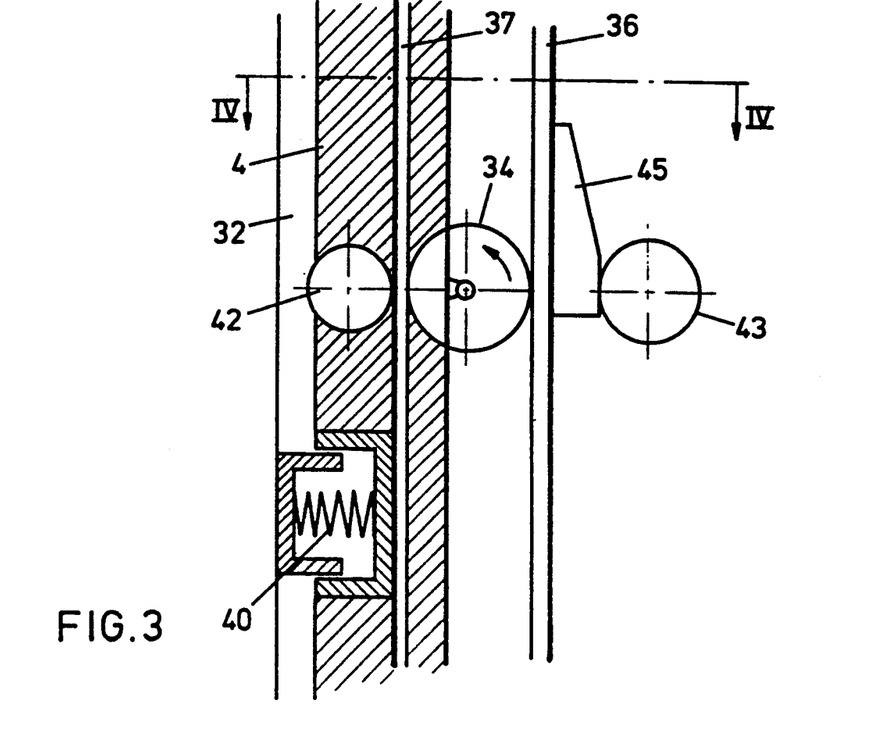
FIG. 3 is a detail of FIG. 2.

FIG. 3 shows a part of FIG. 2, but in FIG. 3 the door is disposed in the definitively closed position. The rear guide rail 36 has been moved entirely upwards and also forwards by the wedge-shaped members 45. The guide wheels of the door have thereby been moved forward too and have forced the front guide rail 37 against the stops 42 counter to the force of the spring or springs 40. The location of the stops has been selected such that in the closed position the door panels themselves are securely pressed against the sealing strips 32 which have been provided around the door opening.

Figure 4:
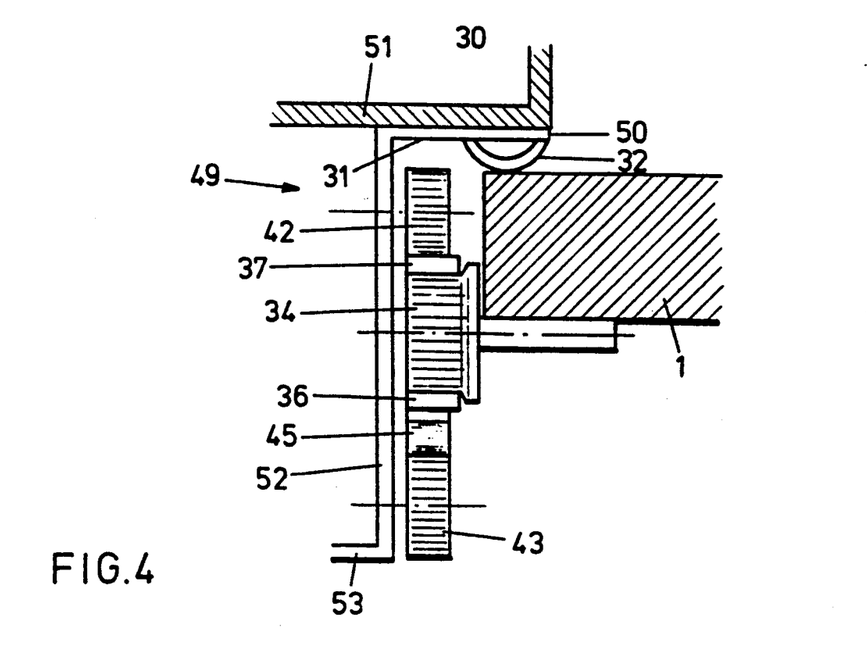
FIG. 4 is a section taken on the line IV—IV of FIG. 3.

This is shown once more in section in FIG. 4. FIG. 4 further shows in what manner the stops 42 and 43 may be mounted on a common substantially L-shaped section 49. The section shown comprises a first leg 50 mounted on the wall 51 in which the door opening to be closed off is disposed. In this embodiment, the first leg 50 is directed towards the door opening and thus also forms the stop surface 31 on which the sealing strip 32 is mounted.

The other leg 52 extends transversely of the wall 51 and supports the stops 42, 43. In this embodiment, the free edge of the leg 52 in turn is flanged outward and forms a stiffening flange 53.

When opening the door, the chains 11, 12 are driven clockwise, whereby the arms 21, 22 first pass the dead center position again and are subsequently moved rearwardly by the chains, the topmost panel being carried along with them. As a result, the topmost panel tilts rearwardly so that the roller 33 (or another projection of the panel or the arm) releases the lever 39. The rear guide rail is then permitted to move downwards. For that purpose, spring means may be provided which pull and/or force the rear guide rail downwards. In the embodiment shown, the lever 39, however, is provided with a cam 55 which upon the returning movement of the connecting arm is operated by the guide wheel 33 (or another projection) whereby the rod 48, and via the rod 48 the rear guide rail 36, is moved downwards. If so desired, this movement can be supported by spring means again.

When the rear guide rail 36 move downwards, a rearward movement also occurs, under the influence of the springs 44. Then the springs 40 can force the front guide rails 37 rearwardly, whereby the door itself is released from the sealing strips 32 via the guide wheels of the door panels. The door is "unplugged".

Due to the above described downward and rearward movement of the rear guide rails, the connection with the curved rail 38 is reestablished, so that the door may subsequently be pulled up during the continued clockwise drive of the chains 11, 12. During that operation, the door runs clear of the sealing strips again.

In the embodiment shown, the stops 42 and 43 are constructed as rotatable rollers, so that during the up and down movement of the rear guide rail 36 only rolling friction develops. The same applies to the front guide rail, which can be carried along to some extent in vertical direction by the guide wheels of the door when the door is being opened or closed.

Figure 5:
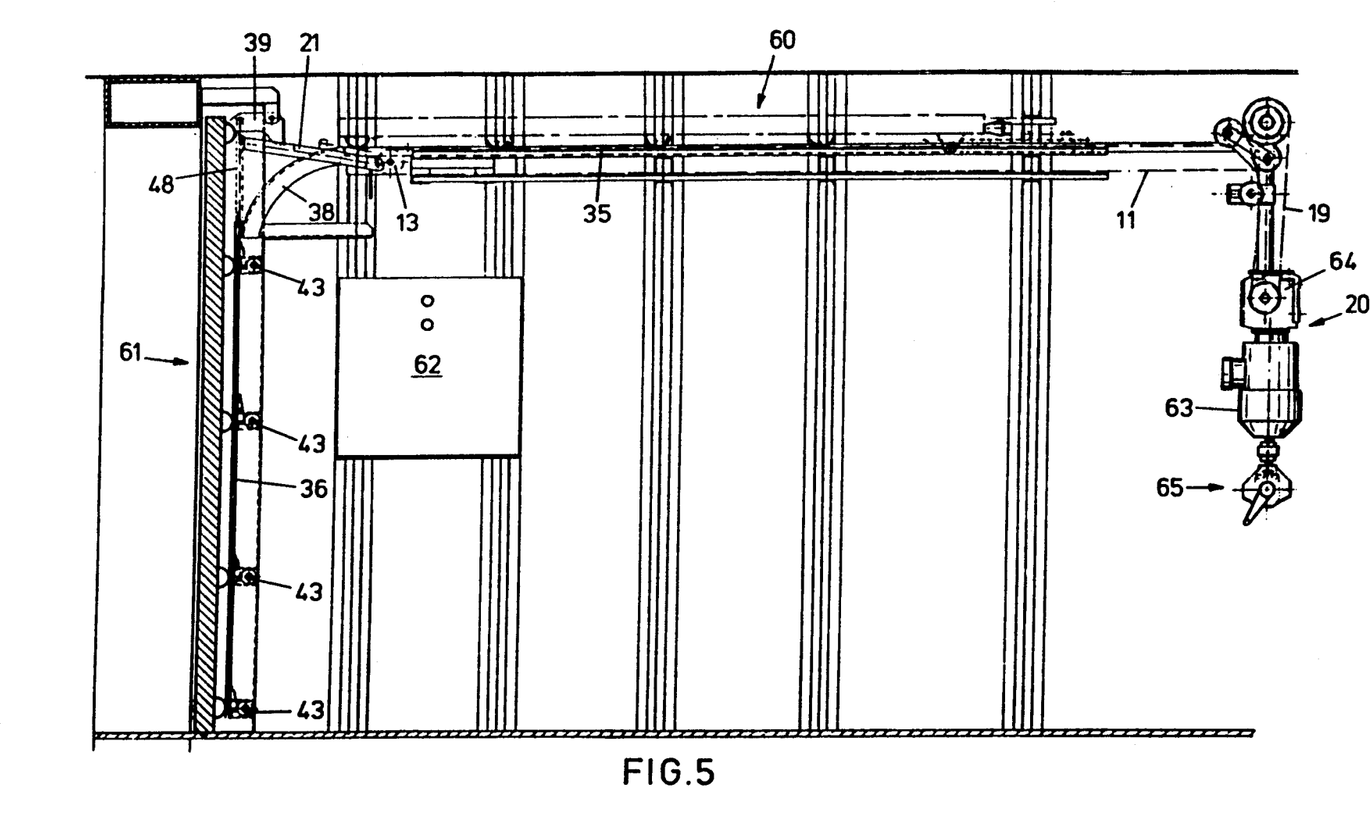
FIG. 5 is a diagrammatic side elevational view similar to that of FIG. 2, of an embodiment of a complete door assembly according to the invention.

For the sake of completeness, FIG. 5 once more shows a door assembly according to the invention, in which the door is shown in the entirely opened position at 60 and in the entirely closed position at 61. In the open position, the door is disposed substantially in horizontal position at the level of the top edge of the door opening. The door is then supported by the horizontal rails 35 via the guide wheels. FIG. 5 further shows at 62 a control box with buttons for opening and closing the door.

In the embodiment shown, the driving means 20 comprise an electric motor 63 which is coupled with a drive chain, belt or rope 19 via a gear box 64.

The electric motor is preferably provided with an automatically operating brake which prevents rotation of the motor when the motor is not excited. It is observed that other drive sources can be used too, such as hydraulic or pneumatic drive units.

Figure 7:
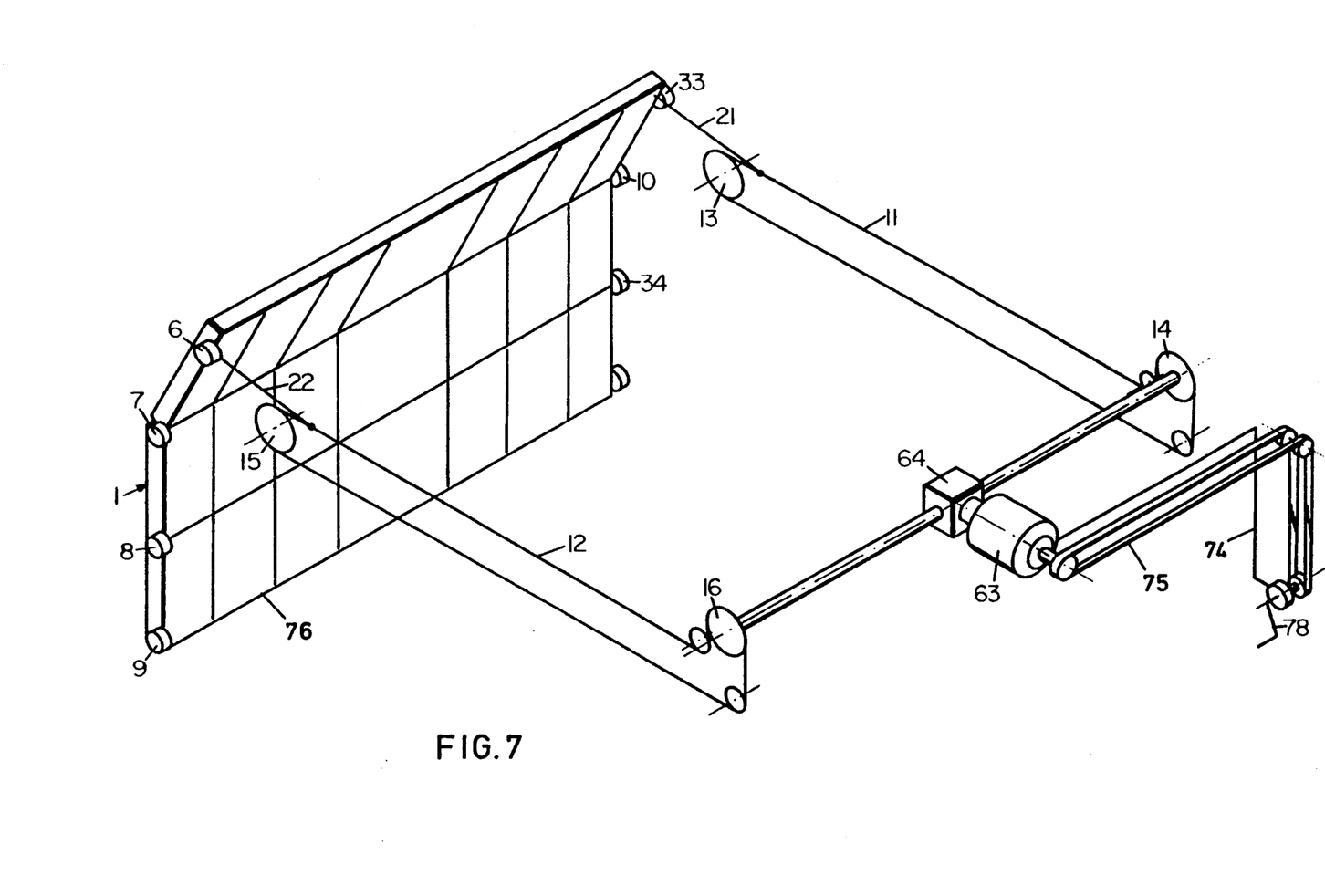
FIG. 7 is a diagram of a variant of FIG. 1.

The gear box may also be directly coupled to the shaft 17, as shown diagrammatically in FIG. 7. In the embodiment of FIG. 7 the gear box and the driving motor are arranged high and central of the space to be closed off by the door, whereas in the arrangement of FIG. 1 and 5, the driving means are arranged comparatively low against a sidewall of the space to be closed off by the door.

However, in either case a manually operated device is used, which can be employed in emergencies. One example of suitable manually operated device 65 is shown diagrammatically in FIG. 6.

Figure 6:
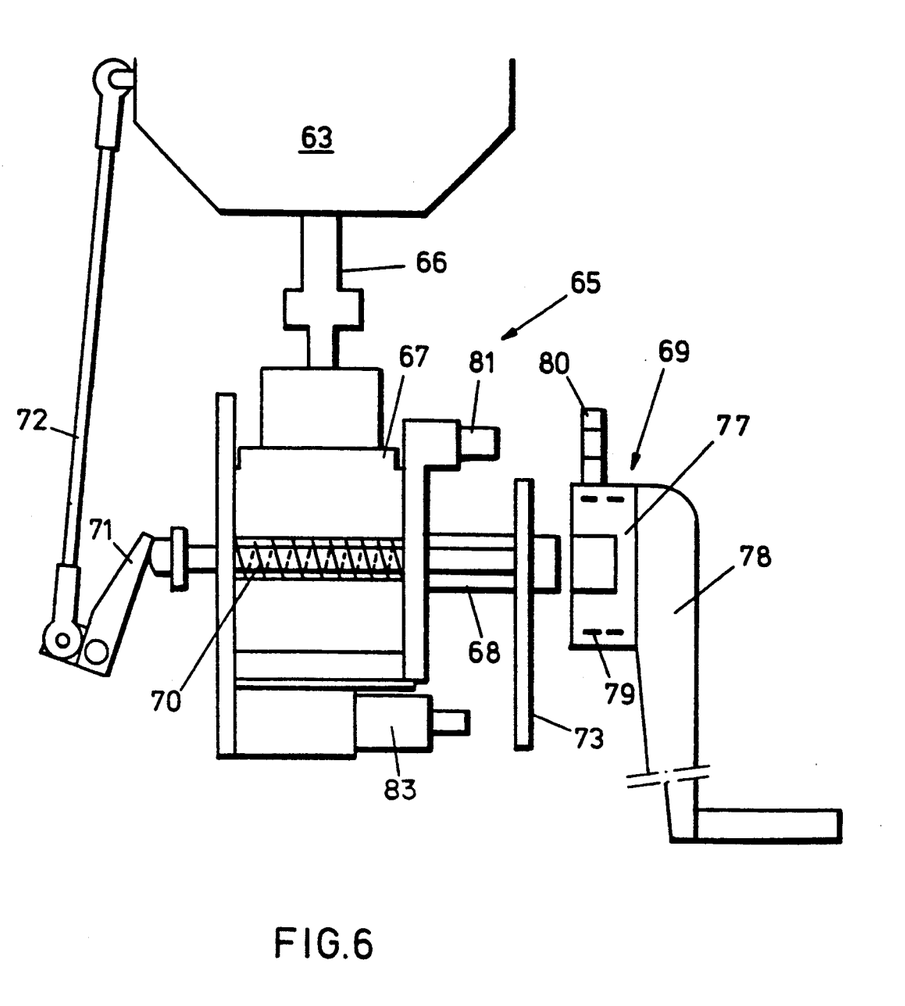
FIG. 6 shows an embodiment of a manually operated device for a door assembly according to the invention.

FIG. 6 shows a gear box 67 coupled to the shaft 66 of the driving motor 63, the gear box 67 having a driving shaft 68 on which a crank 69 can be mounted. The crank is slidable upon the driving shaft 68. When the crank is fitted onto the driving shaft as far as possible and is pushed in the direction of the gear box 67, the driving shaft 68 moves rearwardly (to the left in FIG. 6), counter to the spring force exerted by a spring 70. The result is that via a lever assembly 71, 72 the brake of the driving motor is uncoupled. Further, a microswitch 83 is operated by a plate 73 mounted on the shaft 68, the microswitch being capable of disconnecting the power to the motor.

The crank comprises a crank head 77 and a crank arm 78. The crank head comprises a spring brake 79 and is provided with a lug 80 which engages around a pin 81 when the crank is fitted onto the shaft 68. The construction is such that the lug 80 engages the pin 81 before the brake of the driving motor is uncoupled. Accordingly, the spring brake 79 is already active at the moment when the brake of the driving motor is uncoupled via the lever assembly 71, 72.

In the embodiment shown in FIG. 7, the lever assembly coupled to the motor brake is schematically shown at 74. Further, in the embodiment of FIG. 7, not a gear box but a rope, belt or chain transmission 75 between the crank and the motor is used.

FIG. 7 further shows an entrance door 76 within the overhead door 1.

When the panels are of a suitable construction, an overhead door according to the invention is very suitable to serve as a fire-proof door for airtight separation, for example of two compartments of a railroad car, a vessel, a building etc.

It is observed that after the foregoing, various modifications will readily occur to those skilled in the art. Thus, the door might consist of a smaller number of panels than shown, even of a single panel. Also, instead of an electric drive, a different drive can be used. Further, the upward movement of the rod 48 could be converted into a plugging movement of the rear guide rails in a different manner, for example via suitably arranged levers and/or rotating cams. it would also be possible to use a single chain with a connecting arm coupled thereto, mounted facing the middle of the door.

Further, the door assembly according to the invention could be used in a position rotated 90°, with the panels being moved in upright position from one of the sides of a door opening before and into the door opening by one or more chains in horizontal position. These and similar modifications are understood to fall within the scope of the invention.

We claim:

1. An overhead door assembly for closing off a door opening located in a wall, comprising:
   an overhead door;
   a plurality of vertical guide members for guiding said overhead door in a vertical direction;
   a plurality of horizontal guide members for guiding said overhead door in a horizontal direction;
   driving means for driving said door along said horizontal and vertical guide members between an open position and a closed position, wherein when said door is moved from the open position to the closed position, the driving means first moves the door to a position in front of the door opening and then moves the door horizontally in a plugging movement so as to close off the door opening; and
   at least one stop member, wherein said driving means comprises a connecting arm connected to the door, and wherein when said door is moved from the open position to the closed position, the connecting arm moves into an over-center position where the connecting arm contacts the stop member so as to prevent unauthorized opening of the door.

2. The overhead door assembly of claim 1, wherein said driving means further comprises a wheel located adjacent said door opening and having a center, an endless transport member passing around said wheel, and a motor for driving said transport member around said wheel, wherein said connecting arm defines an axis and is connected to said transport member at a connecting point, and wherein said over-center position is defined by the movement of the connecting arm past a dead-center point defined by alignment of the axis of the connecting arm with a line extending from the center of the wheel to the connecting point.

3. The overhead door assembly of claim 1, further comprising a substantially L-shaped bracket having a first leg connected to said wall and a second leg extending away from said wall, wherein said vertical guide members each comprise first and second vertical guide rails which are movable horizontally, and wherein said door assembly further comprises a plurality of stops which limit horizontal movement of said first and second guide rails, said stops being mounted on said second leg.

4. The overhead door assembly of claim 3, wherein said first leg serves as a stop surface against which said door in pressed when in the closed position.

5. The overhead door assembly of claim 4, further comprising a sealing strip connected to said first leg.

6. An overhead door assembly for closing off a door opening located in a wall, comprising:
   an overhead door;
   a plurality of vertical guide members for guiding said overhead door in a vertical direction;
   a plurality of horizontal guide members for guiding said overhead door in a horizontal direction;
   driving means for driving said door along said horizontal and vertical guide members between an open position and a closed position, wherein when said door is moved from the open position to the closed position, the driving means first moves the door to a position in front of the door opening and then moves the door horizontally in a plugging movement so as to close off the door opening;
   at least one stop member, wherein said driving means comprises a connecting arm connected to the door, and wherein when said door is moved from the open position to the closed position, the connecting arm moves into an over-center position where the connecting arm contacts the stop member so as to prevent unauthorized opening of the door;
   said door comprises at least one door panel and a plurality of guide wheels located on opposing sides of said door panel, wherein each of said vertical guide members comprises a first movable vertical guide rail, wherein said first guide rails guide the door to said position in front of said door opening, and wherein said driving means moves said first guide rails horizontally toward the door opening, whereby the first guide rails press the guide wheels of the door horizontally, causing the door to close off the door opening; and
   said driving means moves said first guide rails vertically, and wherein said door assembly comprises cooperatively sloping surfaces and stops which cause said first guide rails to move horizontally upon vertical movement of the movable guide rails.

7. The overhead door assembly of claim 6, wherein said stops comprise a plurality of rotatable rollers, each roller having an axis which is fixed relative to said wall.

8. The overhead door assembly of claim 6, further comprising a lever connected to one of said first guide rails and to a pivot point which is fixed relative to said wall, and engaging means attached to said door for engaging said lever upon movement of said door toward the closed position by the driving means, causing rotation of said lever so as to move said one of said first guide rails vertically.

9. The overhead door assembly of claim 8, wherein said engaging means is connected to an upper part of said door.

10. The overhead door assembly of claim 9, wherein said engaging means comprises one of said guide wheels.

11. The overhead door assembly of claim 8, wherein said lever comprises a cam, and wherein a projection attached to said door engages said cam upon movement of said door toward the open position by the driving means, causing rotation of said lever so as to move said one of said first guide rails vertically.

12. The overhead door assembly of claim 6, further comprising biasing means for biasing said first guide rails away from the door opening.

13. The overhead door assembly of claim 6, wherein said sloping surfaces are formed by wedge-shaped members attached to said first guide rails.

14. An overhead door assembly for closing off a door opening located in a wall, comprising:
   an overhead door;
   a plurality of vertical guide members for guiding said overhead door in a vertical direction;
   a plurality of horizontal guide members for guiding said overhead door in a horizontal direction;
   driving means for driving said door along said horizontal and vertical guide members between an open position and a closed position, wherein when said door is moved from the open position to the closed position, the driving means first moves the door to a position in front of the door opening and then moves the door horizontally in a plugging movement so as to close off the door opening;
   at least one stop member, wherein said driving means comprises a connecting arm connected to the door, and wherein when said door is moved from the open position to the closed position, the connecting arm moves into an over-center position where the connecting arm contacts the stop member so as to prevent unauthorized opening of the door;
   said door comprises at least one door panel and a plurality of guide wheels located on opposing sides of said door panel, wherein each of said vertical guide members comprises a first movable vertical guide rail, wherein said first guide rails guide the door to said position in front of said door opening, and wherein said driving means moves said first guide rails horizontally toward the door opening, whereby the first guide rails press the guide wheels of the door horizontally, causing the door to close off the door opening;
   wherein each of said vertical guide members further comprises a second vertical guide rail extending in parallel to the guide rails, and wherein when said first guide rails are biased away from the door opening, the first and second guide rails of each vertical guide member are spaced apart a distance greater than a diameter of the guide wheels;
   wherein said second guide rails are movable horizontally, and wherein said door assembly further comprises biasing means for biasing said second guide rails away from the door opening;
   a plurality of stops fixedly mounted relative to said wall which limit horizontal movement of the second guide rails; and
   wherein said stops are rotatable rollers.

15. The overhead door assembly of claim 14, further comprising a plurality of springs which connect said second guide rails to said wall.

16. An overhead door assembly for closing off a door opening located in a wall, comprising:
   an overhead door;
   a plurality of vertical guide members for guiding said overhead door in a vertical direction;
   a plurality of horizontal guide members for guiding said overhead door in a horizontal direction;
   driving means for driving said door along said horizontal and vertical guide members between an open position and a closed position, wherein when said door is moved from the open position to the closed position, the driving means first moves the door to a position in front of the door opening and then moves the door horizontally in a plugging movement so as to close off the door opening; at least one stop member, wherein said driving means comprises a connecting arm connected to the door, and wherein when said door is moved from the open position to the closed position, the connecting arm moves into an over-center position where the connecting arm contacts the stop member so as to prevent unauthorized opening of the door; and
   wherein said driving means comprises a motor having a shaft, a brake which prevents rotation of said shaft when said motor is not in operation, and manually-operable means comprising means for uncoupling said brake and means for manually rotating said shaft.

17. The overhead door assembly of claim 16, wherein said manually-operable means comprises a microswitch which is actuated so as to cut off the power supply to said motor.

* * * * *